United States Patent [19]
Kaeufer et al.

[11] Patent Number: 4,576,775
[45] Date of Patent: Mar. 18, 1986

[54] PROCESS FOR THE PREPARATION OF INJECTION MOLDED-STRETCH FORMED THERMOPLASTIC RESIN ARTICLES

[75] Inventors: Helmut Kaeufer, Metzkausen; August Burr, Berlin, both of Fed. Rep. of Germany

[73] Assignee: Deutsche Solvay Werke GmbH, Solingen, Fed. Rep. of Germany

[21] Appl. No.: 411,294

[22] Filed: Aug. 25, 1983

[30] Foreign Application Priority Data

Aug. 27, 1981 [DE] Fed. Rep. of Germany ....... 3133872
Apr. 27, 1982 [DE] Fed. Rep. of Germany ....... 3215588

[51] Int. Cl.$^4$ .................. B30B 7/00; B29C 45/57; B29C 57/10
[52] U.S. Cl. .................. 264/323; 264/325; 264/328.7; 425/547; 425/393
[58] Field of Search ............... 264/328.7, 296, 328.18, 264/328.7, 320, DIG. 83, 323, 325; 425/542, 576, 547, 393

[56] References Cited

U.S. PATENT DOCUMENTS

| | | | |
|---|---|---|---|
| 3,324,509 | 6/1967 | Hey et al. | 264/320 X |
| 3,532,786 | 10/1970 | Coffman | 264/320 X |
| 3,644,271 | 2/1972 | Tulley | 264/328.18 |
| 3,953,560 | 4/1976 | Klein | 264/DIG. 83 |
| 3,983,196 | 9/1976 | Gray | 264/DIG. 83 |
| 4,012,386 | 3/1977 | Davis | 264/328.7 X |
| 4,079,111 | 3/1978 | Uhlig | 264/296 |
| 4,094,952 | 6/1978 | Frank | 264/328.7 |
| 4,150,079 | 4/1979 | Chang | 264/523 |
| 4,150,088 | 4/1979 | Chang et al. | 264/328 |
| 4,183,991 | 1/1980 | Smiley et al. | 264/328.18 |
| 4,184,835 | 1/1980 | Talbot | 425/577 |
| 4,238,181 | 12/1980 | Dannels et al. | 425/543 |
| 4,272,475 | 6/1981 | Chi | 264/320 X |
| 4,364,878 | 12/1982 | Laliberte et al. | 264/328.7 X |
| 4,409,169 | 10/1983 | Bartholdsten et al. | 264/328.7 X |

OTHER PUBLICATIONS

Kaufer, H. and A. Burr, "Comparison Between Transfer-Injection Stretch Moulded and Injection Moulded Pom Gear Wheels", *German Plastics*, translated from and in *Kunststoffe*, 73 (1983), 11, pp. 684-689.

*Primary Examiner*—Philip Anderson
*Attorney, Agent, or Firm*—Schwartz, Jeffery, Schwaab, Mack, Blumenthal & Evans

[57] ABSTRACT

Disclosed is a process for the production of a shaped article from a thermoplastic resinous material, comprising the steps of heat plastifying the thermoplastic material; injecting the heat-plastified plastic material into a forming tool having a first shape configuration and at least one parting plane, to form a pre-form of the thermoplastic material; subjecting the thermoplastic material pre-form in the forming tool to a cooling phase; providing at least a partially new second shape configuration to the forming tool containing the pre-form; and during the cooling phase subjecting the pre-form in the forming tool having the second shape configuration to at least one pressure treatment under elevated pressure to produce a shaped article. Also disclosed are several embodiments of apparatus for carrying out the process.

13 Claims, 7 Drawing Figures description of preferred embodiments when considered together with the attached figures of drawing.

DETAILED DESCRIPTION OF PREFERRED EMBODIMENTS

Figure 1A:
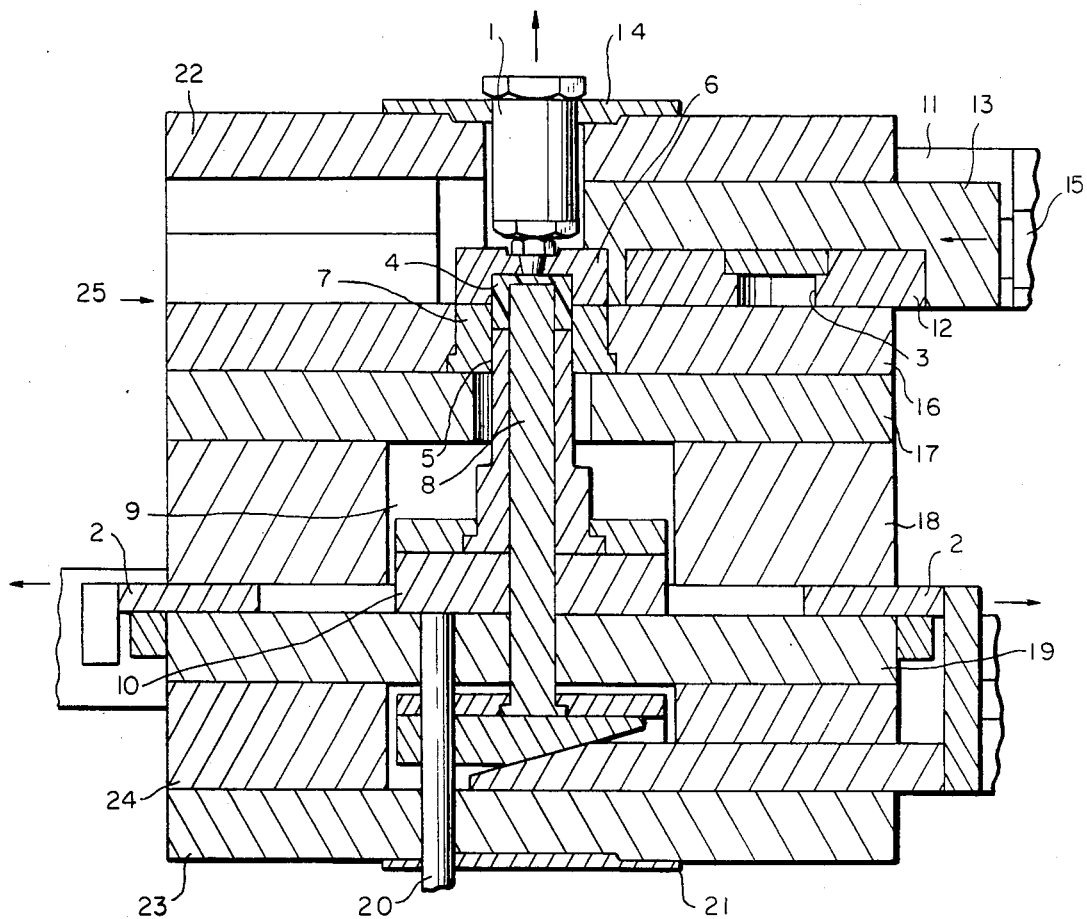
FIGS. 1a, 1b and 1c are a schematic cross-sectional view of a preferred embodiment of the apparatus according to the invention at different stages of operation.

In the process according to the invention, the synthetic resinous material to be processed is brought into or injected into a tool having one or several parting planes, using a plastifying device (plastifying unit), preferably an injection molding machine. During the cooling phase in the tool, the injection molded part or the preform is subjected to at least one deformation under pressure (pressure stretching) and/or a pressure treatment, using new or partially new mold cavities or the same cavity.

Plastifying and injection into the tool are thus carried out preferably by means of an injection molding machine and a tool or mold joined to it. The injection molded part or the preform is exposed during the cooling phase in the tool to deformation under pressure (pressure stretching) and/or a pressure treatment, using a pressure of from about 20 to 1300 N/mm$^2$, preferably from about 100 to 800 N/mm$^2$.

According to a preferred embodiment, a compression force of the closing unit of an injection molding machine with a value of from about 50 to 50,000 KN, preferably from about 150 to 10,000 KN, is applied to the injection molded part or the preform, during the cooling phase in the tool. This compression force is generated by the closing unit of the injection molding machine or machines and/or by the use of one or several hydraulic or compressed air cylinders, which preferably are connected with a core puller device attached to the injection molding machine. The core puller device or devices of the injection molding machine operate at system pressures of from about 1 to 100 N/mm$^2$, preferably from about 4 to 25 N/mm$^2$. Using new or partially new mold cavities or the same cavity, the injection molded parts or preforms are exposed to at least one deformation under pressure (pressure stretching) and/or to at least one pressure treatment using new or partially new mold cavities or the same cavity. In the process, a pressure of from about 20 to 1300 N/mm$^2$, preferably from about 100 to 800 N/mm$^2$, is applied to the injection molded part or the preform.

As a result of the fact that, according to the invention, the closing force and the force of deformation or pressure stretching force may be controlled separately, synthetic articles and molded parts and the like may be made with a high quality (in particular, mechanical strength) and good dimensional stability.

As the rate of deformation may also be regulated in keeping with the invention, breaks of the external skin and other quality defects are extensively avoided, according to the process.

According to a particularly advantageous embodiment, the synthetic resin is injected by a nozzle 1 into a mold cavity, while the parting plane(s) of the tool is (are) held by the corresponding closing unit of the injection molding machine. During the cooling of the preform or the molded part, a new part of a new mold cavity is brought into working position with respect to the preform or molded part on the nozzle side or the ejector side by the opening of the parting plane 25, and by means of reclosing the tool after removal of the spacing ledges 2 or similar plates or parts of the tool or mechanisms, a deformation by pressure or pressure stretching is effected by means of the appropriately regulated force of the closing unit. This force is preferably infinitely adjustable.

According to this embodiment, it is possible to carry out the deformation by pressure or pressure stretching of objects, molded parts or the like in rapid succession. For example, a pressure stretching or deformation of a part, including the deformation of a part perpendicularly to the direction of the closing force can be accomplished beyond the projected area of the preform, so that the manufacture of differently shaped objects according to the process is expanded.

According to a further preferred embodiment, plastification and injection into the tool is effected by means of an injection molding machine and a tool or mold connected with it. The injection molded part or the preform is subjected during the cooling phase in the tool to deformation under pressure (pressure stretching) and/or to a pressure treatment, using a pressure of from about 20 to 1300 N/mm$^2$, preferably from about 100 to 800 N/mm$^2$ and is subjected in a new or partially new mold cavity to a further deformation under pressure (pressure stretching) and/or a pressure treatment, with the period of time between the two pressure treatments being adjusted as a function of the cooling and restoring behavior of the synthetic resin material.

According to one embodiment, the synthetic resin introduced into the mold cavity of the injection molding machine contains inorganic and/or organic fibers, fillers and/or reinforcing materials. The fibers, fillers and/or reinforcing materials possess according to one embodiment entirely or partially assymmetric configurations. By means of this use of asymmetric configurations of the fillers and/or reinforcing materials, specific directional orientations may be obtained in the synthetic resin object, molded part, etc.

The mixture of the synthetic resin introduced into the mold cavity of the injection molding machine consists (for each 100 parts by weight) of from about 0.1 to 80 parts by weight, preferably from about 5 to 45 parts by weight, of inorganic and/or organic fibers, fillers or reinforcing materials and from about 99.9 to 20 parts by weight, preferably from about 95 to 55 parts by weight, of synthetic resins, to which additional processing aids may be added.

The fibers contained in the synthetic resin materials advantageously have a fiber length of from about 0.001 to 10 mm, preferably from about 0.5 to 5 mm.

In the new or partially new mold cavity, different material, synthetic resins or mixtures of synthetic resins may be used, with the finished parts obtained thereby having the same dimensions (with the exception of a possible dimensional deviation in the direction of the movement of the forming die).

PROCESS FOR THE PREPARATION OF INJECTION MOLDED-STRETCH FORMED THERMOPLASTIC RESIN ARTICLES

BACKGROUND OF THE INVENTION

The present invention relates to a process and an apparatus for the preparation of molded parts or objects from synthetic resinous materials, whereby employing an injection molding machine, the synthetic resin to be processed is subjected to deformation under pressure (pressure stretching) and/or pressure treatment with the use of a relatively high pressure, in a tool having one or several parting planes, or the preform during the cooling phase in the tool is subjected to such a treatment with the use of new or partially new mold cavities or the same mold cavity.

A process is already known from DE-OS No. 28 56 580, wherein a structure-forming process is carried out by means of a special pressure deformation during cooling after the initial molding or initial deformation, or is carried out in a separate work process. In this process, the initial material is an extruded, cast or injection molded semi-finished product, and compression deformation is effected. It is one of several disadvantages of the process that the molded parts formed are not dimensionally stable as a function of their external configuration and thickness and/or that they may contain defects (for example, breaks of the outer skin).

Furthermore, this pressure-forming process cannot be applied to molded parts having a projected area in the direction of the movement of the forming die which is larger than the surface of the die.

SUMMARY OF THE INVENTION

It is therefore an object of the present invention to provide an improved process for the preparation of molded objects from synthetic resins.

It is a further object of the invention to avoid the above-mentioned disadvantages and to improve the process according to the prior art for the manufacture of synthetic resinous molded objects.

A further object of the invention is to provide for improved molded objects and molded parts prepared by the process.

Still another object of the invention resides in the provision of an improved apparatus for carrying out the process of the invention.

In accomplishing the foregoing objects, there has been provided in accordance with the present invention, a process for the production of a shaped article from a thermoplastic material, comprising the steps of heat plastifying the thermoplastic material; injecting the heat-plastified thermoplastic material into a forming tool having a first shape configuration and at least one parting plane, to form a pre-form of the thermoplastic material; subjecting the thermoplastic material pre-form in the forming tool to a cooling phase; providing at least a partially new second shape configuration to the forming tool containing the pre-form; and during the cooling phase subjecting the pre-form in the forming tool having the second shape configuration to at least one pressure treatment under elevated pressure to produce a shaped article. Preferably, the heat plastifying and injecting steps are carried out in an injection molding device and wherein the elevated pressure comprises a pressure of from about 20 N/mm$^2$ to 1300 N/mm$^2$, preferably from about 100 N/mm$^2$ to 800 N/mm$^2$. In another embodiment, the process further comprises the step of providing, after the pressure treatment step, at least a partially new third shape configuration to the forming tool containing the pressure-treated shaped article and subjecting the pressure-treated shaped article to a second pressure treatment under elevated pressure, wherein the period of time between the first and second pressure treatment is selected as a function of the cooling and recovery behavior of the thermoplastic material.

In one embodiment, the step of providing at least a partially new second shape configuration comprises opening the forming tool at the parting plane, moving at least one wall section of the forming tool and reclosing the forming tool. In another embodiment, the step of providing at least a partially new second configuration comprises opening the forming tool at the parting plane and removing the pre-form from a first mold cavity in the forming tool, moving the pre-form into alignment with a second mold cavity, preferably by rotation of the pre-form and reclosing the forming tool. In this latter embodiment, upon reclosing the forming tool, the pre-form is subjected to the pressure treatment, and essentially simultaneously a new pre-form is injected into the first mold cavity.

In accordance with another aspect of the present invention, there has been provided an apparatus for the production of a shaped article from a thermoplastic resinous material, comprising means for heat plastifying the thermoplastic material; a first forming tool having a first shape configuration and at least one parting plane; means for injecting the heat-plastified thermoplastic material into the forming tool to form a pre-form of the thermoplastic material; means for cooling the thermoplastic material pre-form in the forming tool; means, including a pressure-generating device, for closing the forming tool at the parting plane(s) with a force sufficient for injection of the thermoplastic material; means for providing at least a partially new second shape configuration to the forming tool containing the pre-form; and means, including the pressure generating device, for subjecting in a separately controlled manner the pre-form in the forming tool having the second shape configuration to at least one pressure treatment under elevated pressure to produce a shaped article.

According to one embodiment, the means for providing a second shape configuration comprises at least one slideable member forming a part of the forming tool and means for selectively sliding the slideable member laterally in order to change the shape configuration of the forming tool.

In another embodiment, the means for providing a second shape configuration comprises a second forming tool and means for transporting the pre-form to the second forming tool, preferably a rotating plate member carrying therein at least two axially movable pressure treatment ram members, the ram members being alternately aligned with the forming tools upon rotation of the plate member, and wherein the pressure treatment means comprises a non-rotating plate member adjacent to the rotating plate member, with the non-rotating plate member having a recess for receiving one end of either of the ram members when it is aligned with the first forming tool.

Further objects, features and advantages of the present invention will become apparent from the detailed The process according to the invention makes possible the automatic, optimal and dimensionally accurate manufacture of molded or finished parts, pressure stretched or deformed molded parts and/or thick-walled molded parts free of or at least low in cavities, all made from reinforced and/or filled or nonreinforced and/or unfilled synthetic resins.

According to a further embodiment of the process according to the invention, a preform is injected by means of an injection nozzle, preferably a dipping nozzle, which is run in to stop against the mold nest insert for the preform on the nozzle side, and simultaneously or nearly simultaneously a second, already injected preform is deformed in the mold nest insert for the finished part, with the application of pressure by a pressure stretching plunger and the sprue separated. The finished part is ejected or removed from the mold after opening of the tool and retraction of the tool cores from the corresponding preform or finished part mold nest inserts on the nozzle side and after the rotation of the corresponding mold plates or mold plate packets on the closing side of the tool. After completion of the rotating motion preferably by 180° and while closing the tool, the core of one pressure stretching plunger with the shrunk-on, injected preform is rammed into the mold nest insert for the finished part, and the free core of the other pressure stretching plunger is rammed into the mold nest insert for the preform.

Advantageously, the pressure deformation of the preform by the pressure stretching plunger is effected after the closing of the tool during the compression of the plate spring packets arranged between the mold plate packets on the closing side, using the force of the closing unit of an injection molding machine or of one or more hydraulic or compressed air cylinders.

Conveniently, the plate springs and/or mechanical and/or hydraulic locks by themselves hold closed the parting plane during the injection process of the preform, the pressure stretching process and the subsequent pressure holding time.

It has further been advantageous to effect the injecting of one preform during the period of time of deformation of the other preform by means of the pressure stretching step.

The invention furthermore relates to devices for the preparation of molded parts of objects of a synthetic resin materials, preferably by means of using the process according to the invention. These devices consist of an injection molding machine and a forming tool with one or several parting planes. According to the invention, the injection molding machine is designed both as a press for holding the parting plane or planes on the tool during the injection and as a press for one or several deformations (pressure stretchings) of the preforms and/or as a press for the application of a post-molding pressure to the molded part. In the machine, during the injection molding, the closing unit, which consists of a mechanical device for closing the tool, is used initially for holding the parting plane(s) on the tool during injection of a preform or molded part and subsequently, in a separately controllable manner, it is used as the press for one or more deformations (pressure stretchings) and/or the application of post-molding pressure to the mold part.

The tool contains one or more slide bars, controlled by means of core pullers, which move the corresponding mold cavities on the nozzle side or the ejector side into the appropriate working position. In a first operating sequence, the injection molded part (preform) is injected. Then, by movement of the slide bar by means of the hydraulic cylinders connected with the core puller devices of the injection molding machine, and either without opening or after opening of the parting plane, the preform is moved into a second mold cavity with the cooperation of the closing unit of the injection molding machine acting as the press and is deformed therein.

The core puller devices and hydraulic cylinders are preferably constructed as presses for the deformation (pressure stretching) and/or the application of pressure after the deformation.

According to one embodiment, an external hydraulic assembly is designed in the form of a press for the deformation (pressure stretching) and/or the application of pressure after deformation.

According to a preferred embodiment, a plurality of plate springs and/or mechanical devices and/or hydraulic means are arranged on the tool or a part of the tool. During the deformation or pressure stretching and/or during the application of the post-de-formation pressure, these hold the parting plane(s) closed.

According to a further, particularly advantageous embodiment, a deforming plunger is provided for the deformation process (pressure stretching), which is suitable both for deformation(s) or pressure stretching(s) and also for use as an ejector.

According to a preferred embodiment, the pressure bolster unit in fully hydraulic injection molding machines consisting of piston and cylinder is designed so that a longer path of deformation is present.

The control of the deformation process by the machine is preferably by electrically or electronically controlled accessories (matrix programm, etc.)

According to a further embodiment, the rate of deformation and/or the deforming pressure is controlled hydraulically using a reducing valve or another valve permitting the regulation of the velocity and/or pressure (for example, a servovalve).

CONSTRUCTION

Referring now to FIG. 1a, the apparatus includes, on the injection nozzle side, the clamping plate 22 and the slide guide plate 11 for the slides 13 which move horizontally and in which the corresponding mold nest inserts 6 and 12 are located. Furthermore, if necessary an ejector unit may be installed on the nozzle side. A hydraulic or pressure force cylinder 15 moves the slide 13 so that either the preform insert 6 or the mold nest 3 (for example, a gear mold nest) will be located centeringly at the movable nozzle 1, as required. The nozzle 1 injects the preform directly in the slide 13.

The ejector slide consists of two packs of three mold plates each (16, 17, 18 and 19, 24, 23) or of a similar configuration, which are capable of performing together, for example, a 15 mm (as viewed in the axial direction of the injection) relative movement on guide bolts. Positioning plates 14 and 21 are provided for clamping plate 22 and mold plate 23, respectively.

A system of plate springs is provided to insure that, in the case of the open tool, the maximum distance determined by fastening screws between the mold plates 18 and 19 is always maintained. When the tool is open, therefore, two hydraulic cylinders, arranged laterally and opposingly on the ejector side, are able to run the spacer plates 2 in and out.

In the packs of mold plates there is an ejector system on the hydraulic ejector of the machine, fixedly attached to the ejector by means of driving pins 20, and also a core 8 which is movable independently of the ejector system.

Ejector ram 5 is mounted on ejector plate 10 which in turn is connected to driving pin 20, and the ejector ram extends upwardly through cavity 9 into the ejector side 7 of mold insert 6.

MODE OF OPERATION

Injection of the preform 4

Figure 1B:
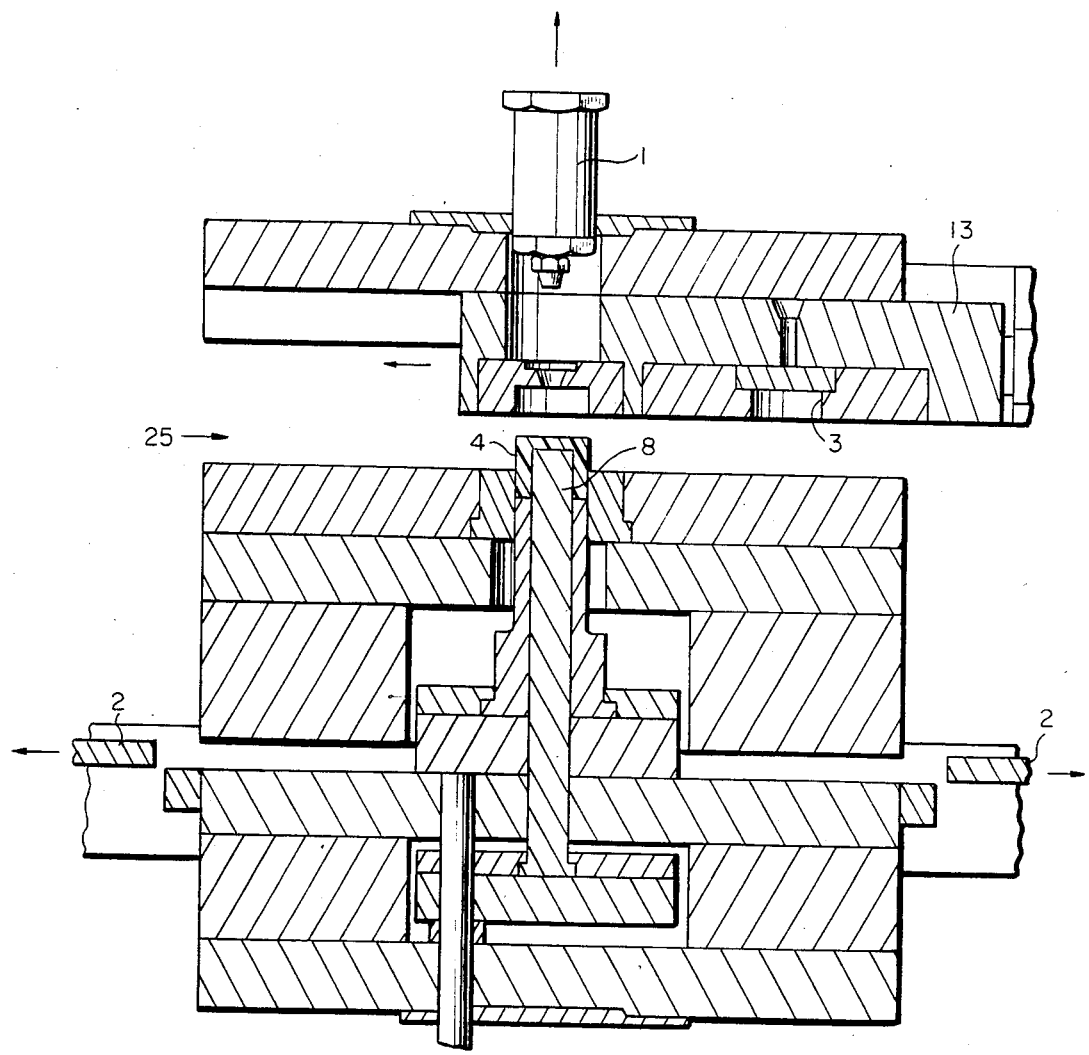

The slide 13 on the nozzle side is in the "inject preform" position (the mold nest insert 6 is centered in front of the nozzle 1). On the ejector side, the spacer plates 2 are inserted. The tool is closed and the movable nozzle 1 runs into the mold nest insert 6 against the stop. The preform 4 is injected. Following the completion of the injection sequence of "inject preform", the nozzle 1 is extracted from the slide 13, and the tool opens simultaneously in the parting plane 25 as shown in FIG. 1b.

Pressure stretching

Figure 1C:
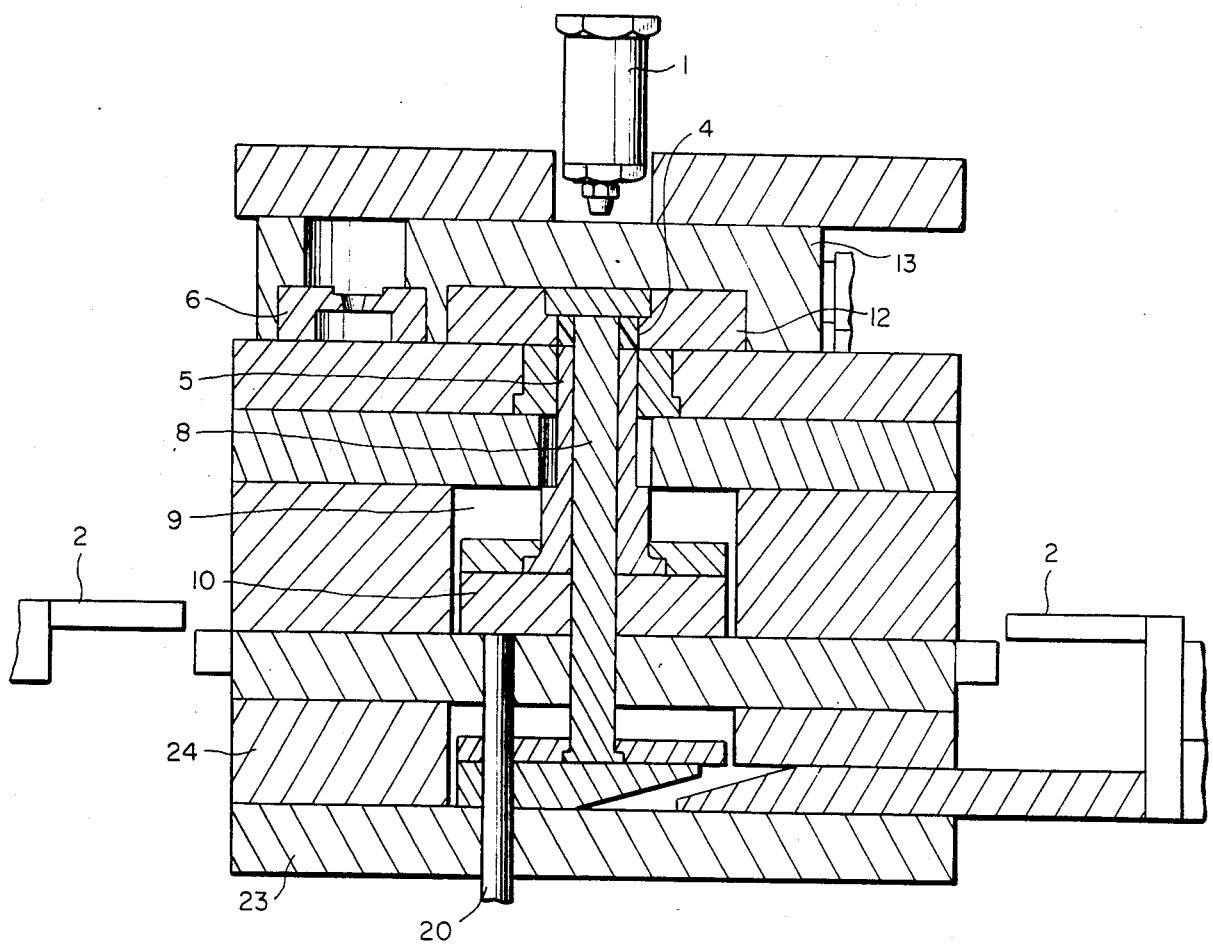
Figure 3:
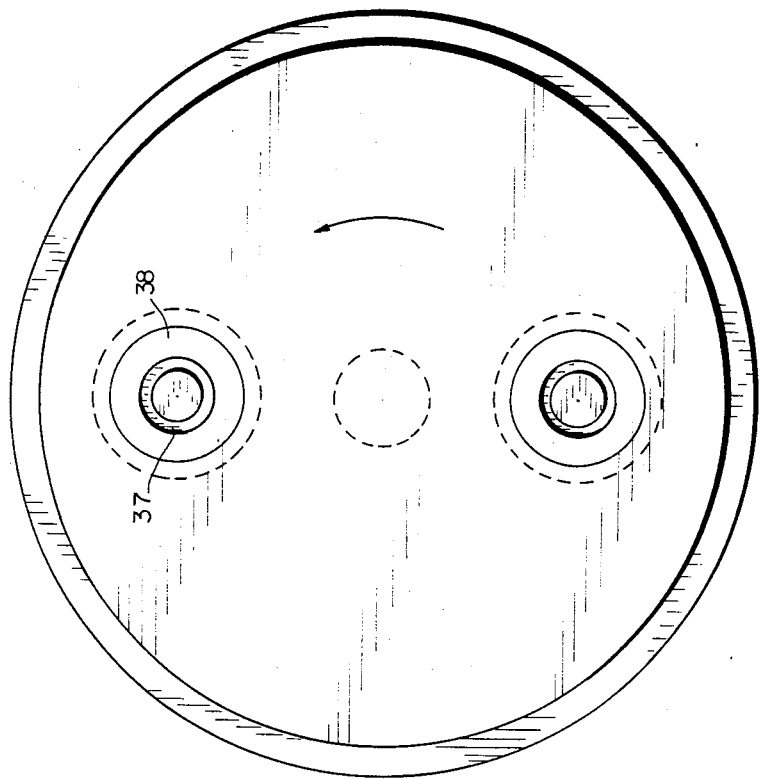
FIG. 3 is a top view of the mold plate of FIG. 2.
Figure 2:
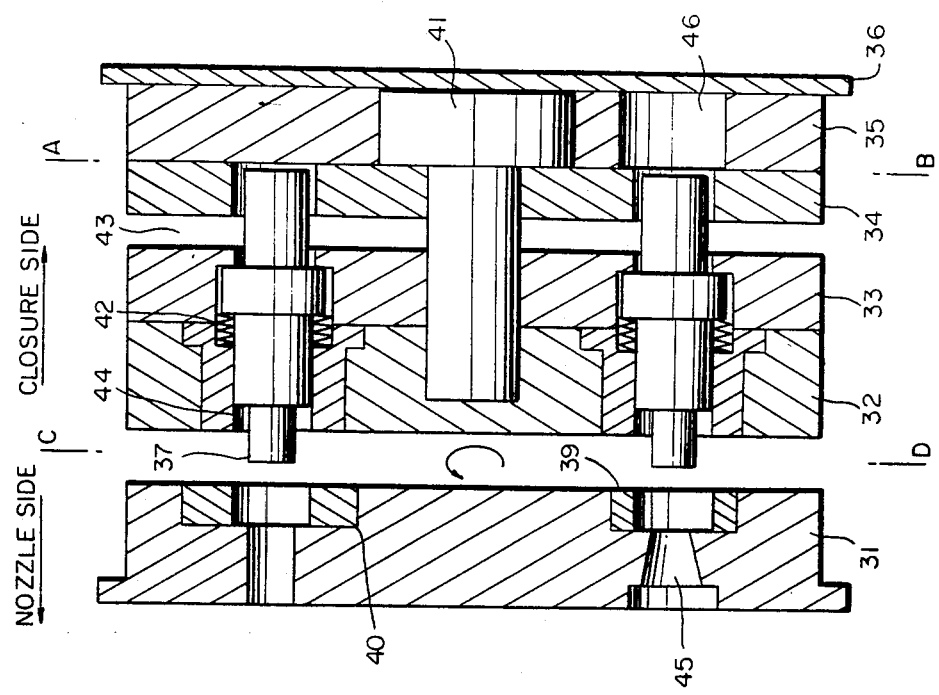
FIG. 2 is a cross-sectional view of the apparatus according to the invention in the open state.

After the end of the opening path of the tool is attained, the slide or slides 13 and the spacer ledges 2 or the like, are actuated by means of hydraulic cylinders, triggered by electrical contacts (terminal switches). The nozzle side moves the slide or slides 13 to the "pressure stretching" position (the mold nest is centered in front of the movable nozzle 1), and the spacer ledges 2 on the ejection side are extracted. As seen in FIG. 1c, upon reclosing the tool, the core 8 surrounded by the preform 4 enters into the mold nest 3 (for example, a gear mold nest), and the two mold packs are compressed on the ejector side with a force set approximately on the closure unit of the injection molding machine. Simultaneously, the core and the forming or ejector ram 5 is moved forward axially in the direction of the nozzle 1 and thereby severs the sprue from the preform In the process, the force acts on the annular surface of the preform 4, which is then deformed, for example, into the configuration of a geared wheel. By means of an inserted system of spring packs or the like, there is prevented an opening of the parting plane 25, caused by the axially acting forming forces of the projected, newly created surface of the teeth. Following the completion of the pressure stretching process, the tool opens after a suitably adjusted pressure hold time, and by means of the hydraulic actuation of the machine ejector, the deforming plunger 5 strips the molded part, for example, a gear wheel, from the core 8, or the part is removed from the mold on the nozzle side by means of a special ejector unit on the nozzle side. The spacer plates 2 and the slide or slides 13 are returned into their initial position of "inject preform".

According to a particularly advantageous embodiment, the forming tool consists on the nozzle side of a fixedly arranged, preferably annular clamping plate or pack of clamping plates, each with a mold nest insert for the preform and for the finished part. On the closing side, it consists of a fixedly arranged pivot pin, fixedly joined with a mold plate and a clamping plate and mold plate packs, preferably of an annular configuration and rotating around the pivot pin and receiving two pressure drawing rams which are movable in guide bushings. The pressure rams are arranged so that they are aligned with the cooperating mold nest inserts in the clamping plate on the nozzle side, while the nonrotating mold plate on the closure side, which is fixedly connected with the pivot pin is provided with a bore or recess for receiving the head of one of the two pressure drawing rams upon closing of the forming tool.

Further advantages of this form of embodiment will become apparent from the following disclosure and claims.

This embodiment shall be explained in more detail with the aid of the exemplary embodiment shown schematically in FIGS. 2 to 5.

By virtue of the presence of a parting plane C-D, this installation has a two-part configuration, divided into a part on the nozzle side and a part on the closure side. The nozzle side consists of a preferably circular clamping plate or pack of clamping plates 31 to receive a mold nest insert for both the perform 39, which communicates with a cavity 45 for the movable nozzle, and the finished part 40, which are arranged symmetrically with respect to each other. The clamping plate or pack of clamping plates 31 is normally stationary, but according to one embodiment may be rotatable or movable in the upward and downward direction.

The closure side of the apparatus consists of the mold plate or pack of mold plates 32, intermediate mold plate 33 and the rotating plate 34, which preferably are circular in shape and in which are received the mold nests 44 on the closure side and the pressure drawing rams 37 with the guide bushings 38 and the pivot pin 41. The pivot pin 41 is fixedly joined with the clamping plate 36 and the mold plate 35 on the closure side. Each pressure drawing ram 37 can be constructed with separate core and sleeve parts and with the use of a further intermediate plate permits a relative movement for the ejection of the molded part on the closure side. The predetermined distance between the mold plates 33 and 34 is maintained constant by the packets of plate springs 43. The mold plate 35, again preferably circular in shape, is provided with a bore or recess 46 to receive the head of one of the two pressure drawing rams 37. The spring pack 42 presses the pressure drawing ram 37 into its initial position in the open state of the installation.

In the open state of the apparatus according to the invention, the mold plates or mold plate packs 32 to 34 may be rotated around the pivot pin 41 in the rotating plane A-B, preferably by 180°. The rotating motion may be effected mechanically or hydraulically.

Mode of operation

In the closed state of the apparatus the following processes take place (with the exception of the first injection cycle):

Initially, the preform is injected by means of a nozzle, preferably a movable nozzle, in the cavity 45. This may also be effected with a time lag during the pressure maintenance time after deformation. Simultaneously or nearly simultaneously, an already molded preform is inserted into the mold nest 40 and deformed via the pressure drawing ram 37 by means of the application of pressure, for example, by the pressure bolster of a fully hydraulic injection molding machine, and by means of the resulting decrease in the distance between the mold plates or mold plate packs 34 to 36 and 32 to 33. The sprue is automatically removed in the process. On the closure side, the motion of the mold plate 34-36 has no effect in view of the recess or bore 46 in the mold plate 35, i.e., there is no deformation.

After opening of the apparatus, there is effected finally a rotating motion of the mold plates 32-34 on the pivot pin 41, preferably by 180°, whereby the injected preform is retained on the closure side, on the core of the pressure drawing ram 37 as a result of shrinking. Simultaneously, the ejector movement is effected on the nozzle side (mold nest 40) or on the closure side (not shown). The finished part is thereby removed from the mold, and the already injection molded preform immobilized in the press or deformation position. The apparatus again closes and the cycle is repeated.

With the aid of the process according to the invention and the apparatus of the invention, a reduction in cycle time of approximately 40% is obtained, as the injection molding of a preform and the pressure stretching of an already molded preform is effected simultaneously. Furthermore, the pressure build-up, for example, of the pressure bolster of a fully hydraulic injection molding machine, is required only once, leading to a saving of energy. Similarly, the elimination of the otherwise necessary spacing ledges on the pressure stretching tool and the matrix circuit of the injection molding machine, simplify the configuration of the apparatus.

The injection molding time of the preform is advantageously shorter than the pressure stretching period for the preform. The onset and end of the process of "inject preform" depend on the prevailing optimization conditions.

Figure 5:
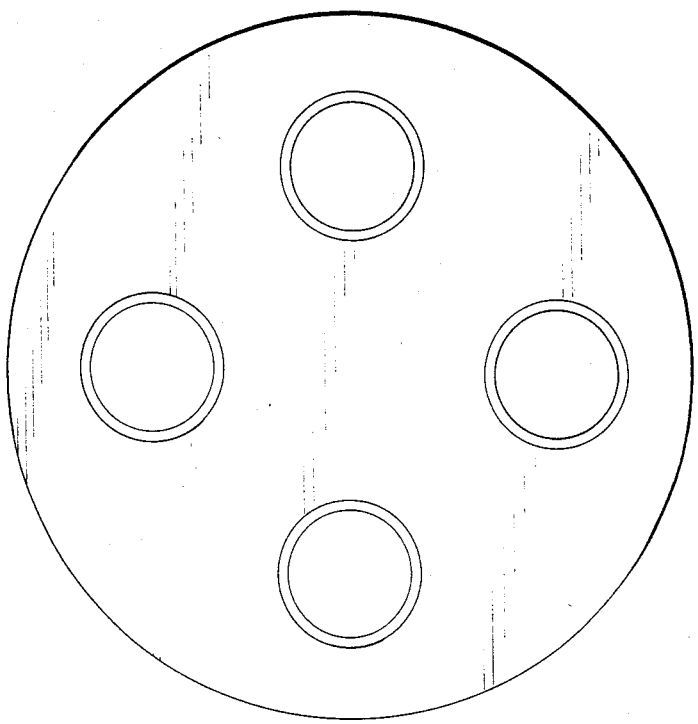
FIG. 5 is a schematic top view of the mold plate on the closure side associated with the embodiment according to FIG. 4, to receive four press-forming rams.
Figure 4:
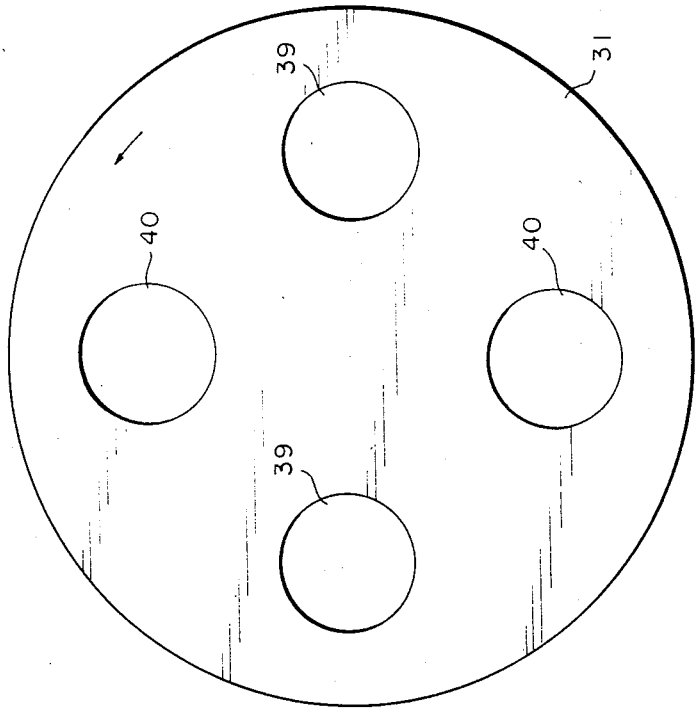
FIG. 4 is a schematic top view of a further advantageous embodiment having a clamping plate on the nozzle side with four mold nest inserts.

By increasing the number of pressure stretching rams and the corresponding number of mold nest inserts in the apparatus according to the invention, the output may be further increased. Thus, FIGS. 4 and 5 show an advantageous embodiment of an installation of this type, wherein according to FIG. 4 the clamping plate 31 is equipped with two preform mold nest inserts 39 and two finished part mold nest inserts 40, offset by 90°, while correspondingly, according to FIG. 5, four pressure-forming rams are provided on the closure side, offset by 90°.

When one or more new or partially new molds are used for the pressure deformation (pressure stretching) and/or pressure treatment, the process according to the invention advantageously is provided with temperature controls such that the mold cavities in which the pressure-forming (pressure stretching) and/or pressure treatment is effected, are preferably at a lower temperature. In the apparatus, this is preferably achieved by providing separate temperature controls for the mold cavities for pressure-forming (pressure stretching) and for the mold cavities for the production of the injection molded part or preform.

What is claimed is:

1. A process for the production of a shaped article from a thermoplastic resinous material, comprising the steps of:
   heat plastifying the thermoplastic material;
   injecting the heat-plastified thermoplastic material into a preform mold cavity in a closed press forming tool having a first shape configuration and at least one parting plane, to form a preform of the thermoplastic material, said preform mold cavity being formed by a preform mold nest and a ram extending thereto, and allowing said preform to partially cool in said preform mold cavity;
   opening the press forming tool at said parting plane and providing an at least partially new second shape configuration to the forming tool containing the preform by aligning said preform and said ram with a shaped article mold nest having a different configuration from said preform mold nest, said ram and said shaped article mold nest forming a second mold cavity, and adjusting said press forming tool to increase the extension of said ram when said press forming tool is reclosed; and
   reclosing the press forming tool and subjecting the preform in said second mold cavity of the forming tool having said second shape configuration before said preform is completely cooled to at least one pressure stretching deformation under an elevated pressure of from about 100 N/mm$^2$ to 800 N/mm$^2$ generated by a compression device applying a press closing force of from about 50 to 50,000 kN to produce a shaped article.

2. A process according to claim 1, wherein said step of providing at least a partially new second shape configuration comprises opening the forming tool at said parting plane, moving at least one wall section of said forming tool and reclosing said forming tool.

3. A process according to claim 1 further comprising the step of providing, after said pressure stretching deformation step, at least a partially new third shape configuration to the forming tool containing the pressure-stretch-deformed shaped article, and subjecting the pressure-stretch-deformed shaped article to a second pressure stretching deformation under elevated pressure, wherein the period of time between the first and second pressure stretching deformations is selected as a function of the cooling and recovery behavior of the thermoplastic material.

4. A process according to claim 1, wherein the thermoplastic material contains at least one additive selected from the group comprising inorganic or organic fibers, a filler or a reinforcing substance.

5. A process according to claim 7, wherein said additives have at least a partially asymmetric configuration.

6. A process according to claim 4, wherein the thermoplastic material comprises, for each 100 parts by weight,
   from about 0.1 to 80 parts by weight of said additives, and
   from about 99.9 to 20 parts by weight of a synthetic resinous material.

7. A process according to claim 6, wherein the thermoplastic material comprises, for each 100 parts by weight,
   from about 5 to 45 parts by weight of said additives, and
   from about 95 to 55 parts by weight of a synthetic resinous material.

8. A process according to claim 7, wherein the thermoplastic material contains fibers having fiber lengths between about 0.001 and 10 mm.

9. A process according to claim 1, wherein the step of providing at least a partially new second shape configuration comprises opening the forming tool at said parting plane and removing the pre-form from a first mold cavity in the forming tool, moving the pre-form into alignment with a second mold cavity, and reclosing the forming tool.

10. A process according to claim 9, wherein upon reclosing the forming tool, the preform form is subjected to said pressure stretching deformation and wherein essentially simultaneously a new pre-form is injected into the first mold cavity.

11. A process according to claim 9 or 10, wherein said alignment of said pre-form and said second mold cavity comprises a rotation of the pre-form fixed to a mold core by 180°.

12. A process according to claim 10, wherein the new pre-form is injection molded within the period of time during which the previous pre-form is subjected to a pressure stretching deformation in the second mold cavity.

13. A process according to claim 1, further comprising the step of maintaining the second shape configuration of said forming tool at a lower temperature during said pressure stretching deformation than the temperature of the first shape configuration of said forming tool during said injection step.

* * * * *